(12) United States Patent
Sinclair

(10) Patent No.: US 11,174,046 B2
(45) Date of Patent: Nov. 16, 2021

(54) SYSTEM AND METHOD FOR ROTATING MASS ATTITUDE CONTROL

(71) Applicant: Larry D. Sinclair, Chino Valley, AZ (US)

(72) Inventor: Larry D. Sinclair, Chino Valley, AZ (US)

( * ) Notice: Subject to any disclaimer, the term of this patent is extended or adjusted under 35 U.S.C. 154(b) by 0 days.

(21) Appl. No.: 16/989,869

(22) Filed: Aug. 10, 2020

(65) Prior Publication Data

US 2021/0061498 A1 Mar. 4, 2021

Related U.S. Application Data

(63) Continuation-in-part of application No. 16/286,506, filed on Feb. 26, 2019, now abandoned.

(51) Int. Cl.
| | | |
|---|---|---|
| *B64G 1/28* | (2006.01) | |
| *B64G 1/42* | (2006.01) | |
| *B64G 1/44* | (2006.01) | |

(52) U.S. Cl.
CPC .............. *B64G 1/28* (2013.01); *B64G 1/283* (2013.01); *B64G 1/425* (2013.01); *B64G 1/443* (2013.01)

(58) Field of Classification Search
CPC .......... B63G 1/28; B63G 1/283; B63G 1/285; B63G 1/286; B63G 1/425; B63G 1/443
See application file for complete search history.

(56) References Cited

U.S. PATENT DOCUMENTS

| | | | | | |
|---|---|---|---|---|---|
| 3,439,548 | A | * | 4/1969 | Horvath | B64G 1/28 74/5.34 |
| 3,452,948 | A | * | 7/1969 | Chang | G01C 21/18 244/165 |
| 3,471,105 | A | * | 10/1969 | Chang | B64G 1/36 244/165 |
| 3,741,500 | A | * | 6/1973 | Liden | B64G 1/286 244/165 |
| 4,723,735 | A | * | 2/1988 | Eisenhaure | B64G 1/283 244/165 |
| 4,732,353 | A | * | 3/1988 | Studer | B64G 1/28 244/165 |
| 5,597,143 | A | * | 1/1997 | Surauer | B64G 1/28 244/164 |
| 7,561,947 | B2 | * | 7/2009 | Bonn | B64G 1/286 701/13 |
| 8,038,101 | B2 | * | 10/2011 | Ogo | B64G 1/286 244/165 |
| 9,180,983 | B2 | * | 11/2015 | Sperandei | B64G 1/283 |
| 10,118,716 | B2 | * | 11/2018 | Bandera | B64G 1/286 |
| 2006/0005644 | A1 | * | 1/2006 | Weaver | F03G 3/06 74/84 S |
| 2011/0219893 | A1 | * | 9/2011 | Fiala | F03G 7/10 74/5.34 |

* cited by examiner

*Primary Examiner* — William Kelleher
*Assistant Examiner* — Gregory T Prather
(74) *Attorney, Agent, or Firm* — Alford Law Group, Inc.; Vy H. Vu

(57) ABSTRACT

The disclosure relates to a method and apparatus of rotating mass attitude control. The method and apparatus entails rotating a mass to generate thrust. Varying the speed and direction of rotation provides some control of the magnitude and direction of the thrust generated. The method and apparatus of the invention pertinent to an attitude control system for spacecrafts or astromotive vehicles under conditions of zero to low gravity and atmosphere.

16 Claims, 6 Drawing Sheets

SYSTEM AND METHOD FOR ROTATING MASS ATTITUDE CONTROL

CROSS REFERENCE

This application is a continuation-in-part of U.S. Non-Provisional patent application Ser. No. 16/286,506 entitled ROTATING MASS PROPULSION SYSTEM METHOD AND APPARATUS filed on Feb. 26, 2019 by inventor Larry D. Sinclair.

FIELD

This invention is generally related to a rotating mass attitude control system and specifically related to a rotating mass attitude control system for low or zero gravity satellites and spacecrafts.

BACKGROUND

There are approximately 2,300 satellites in orbit around the earth today. Military, scientific, and communication satellites are vital to the functioning of many industrialized nations. While only a few countries have the capabilities to launch their own satellites, companies such as SpaceX and United Launch Alliance have privatized space launches and made it available for purchase. Thanks to the commoditization of space flight, even the smallest of nations can afford to place a satellite in orbit. Countries such as Ghana have launched their own satellite as a mark of national pride and also to cut the cost of buying satellite data from other countries. Consequently, geosynchronous orbit has become quite crowded.

Satellites are a key component of global telecommunication. About 60 percent of all satellites play some role in communication. Communication satellites are generally in geostationary orbit above the earth. Communication and remote sensing satellite, may need to adjust their attitude to cover areas of the globe. Attitude control is the process of controlling the orientation of an aerospace vehicle with respect to an inertial frame of reference or another entity such as the celestial sphere, certain fields, and nearby objects, etc.

A spacecraft's attitude should be stabilized and controlled for a variety of reasons. For example, a remote sensing satellite's high-gain antenna can be accurately pointed to Earth for communications, so that onboard experiments may accomplish precise pointing for accurate collection and subsequent interpretation of data. A spacecraft can also take advantage of the heating and cooling effects of sunlight and shadow can be used for thermal control. Short propulsive maneuvers can oftentimes be needed and it is more efficient to correct the attitude of a spacecraft so that it is pointing in the right direction.

There are two principal approaches to stabilizing attitude control on a spacecraft; spin stabilization and three-axis stabilization.

Spin stabilization is accomplished by setting the spacecraft spinning, using the gyroscopic action of the rotating spacecraft mass as the stabilizing mechanism. Propulsion system thrusters are fired only occasionally to make desired changes in spin rate, or in the spin-stabilized attitude. If desired, the spinning may be stopped through the use of thrusters or by yo-yo de-spin.

Three-axis stabilization is an alternative method of spacecraft attitude control in which the spacecraft is held fixed in the desired orientation without any rotation. One method of three-axis stabilization is to use small thrusters to continually nudge the spacecraft back and forth within a band of allowed attitude error.

Another method for achieving three-axis stabilization is to use electrically powered reaction wheels, also called momentum wheels, which are mounted on three orthogonal axes aboard the spacecraft. They provide a means to trade angular momentum back and forth between spacecraft and wheels.

To rotate the vehicle on a given axis, the reaction wheel on that axis is accelerated in the opposite direction. To rotate the vehicle back, the wheel is slowed. Excess momentum that builds up in the system due to external torques from, for example, solar photon pressure or gravity gradients, must be occasionally removed from the system by applying controlled torque to the spacecraft to allow the wheels to return to a desired speed under computer control. This is done during maneuvers called momentum desaturation or momentum unload maneuvers. Most spacecraft use a system of thrusters to apply the torque for desaturation maneuvers. A different approach was used by the Hubble Space Telescope, which had sensitive optics that could be contaminated by thruster exhaust, and instead used magnetic torquers for desaturation maneuvers.

There are advantages and disadvantages to both spin stabilization and three-axis stabilization. Spin-stabilized craft provide a continuous sweeping motion that is desirable for fields and particles instruments, as well as some optical scanning instruments, but they may require complicated systems to de-spin antennas or optical instruments that must be pointed at targets for science observations or communications with Earth. Three-axis controlled craft can point optical instruments and antennas without having to de-spin them, but they may have to carry out special rotating maneuvers to best utilize their fields and particle instruments. If thrusters are used for routine stabilization, optical observations such as imaging must be designed knowing that the spacecraft is always slowly rocking back and forth, and not always exactly predictably. Reaction wheels provide a much steadier spacecraft from which to make observations, but they add mass to the spacecraft, they have a limited mechanical lifetime, and they require frequent momentum desaturation maneuvers, which can perturb navigation solutions because of accelerations imparted by the use of thrusters

SUMMARY

An aspect of this invention is generally related to a method and apparatus of a rotating mass attitude control system for use in zero or low gravity satellites.

Embodiments of the invention comprise multiple rotating masses that are generally circular or disk shaped. Multiple rotating masses can be equally spaced about the circumference of a circle, the circle being on a reference plane, such that each rotating mass is balanced by one or more of the other rotating mass on the circumference of the circle. The axis of rotation of the rotating mass would be parallel to the reference plane. It would be beneficial to have the center of rotation of each rotating mass lie on the same plane. Actuation of the rotating mass causes the spacecraft to spin in the opposite direction of the spin of the rotating mass. Varying the speed and direction of the rotation of multiple rotating masses varies the direction and speed of rotation of the spacecraft allowing for agile attitude control.

This summary was provided to efficiently present the general concept of the invention and should not be interpreted as limiting the scope of the claims.

DETAILED DESCRIPTION OF THE EXEMPLARY EMBODIMENTS

Figure 1:
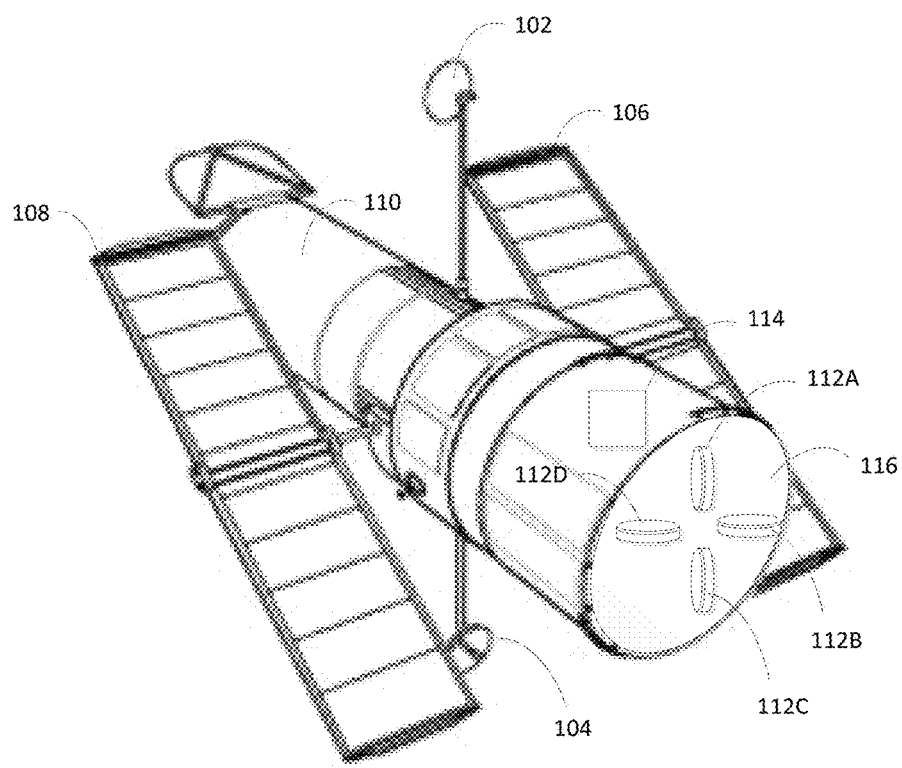
FIG. 1 illustrates a perspective view of a rotating mass attitude control system installed in an exemplary spacecraft.
Figure 1:
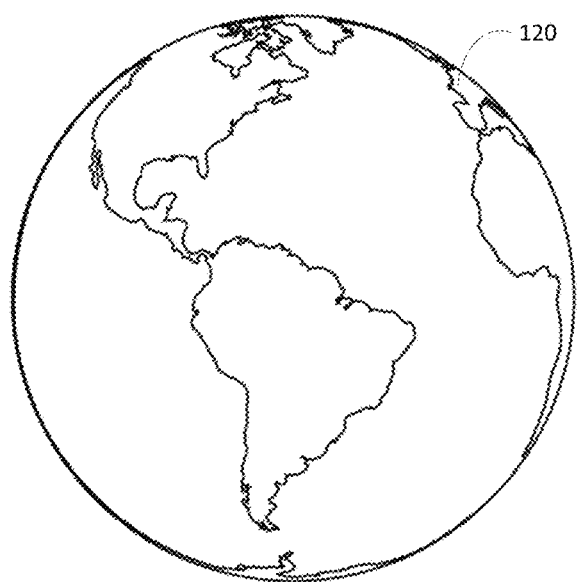

Method and apparatus to provide a rotating mass attitude control system are described below. In the following description, numerous specific details are set forth. However, it is understood that embodiments of the invention may be practiced without these specific details. In other instances, well-known components, structures, and techniques have not been shown in detail in order to not obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

The word spacecraft is used in this Application to denote a vehicle or device designed for travel or operate outside the Earth's atmosphere, whereas a satellite is an object that orbits the Earth, the moon, or another celestial body. The term "astromotive" is used in this Application in conjunction with "device" to refer to a personal device for moving a person or persons in low or zero gravity conditions.

For thousands of years humankind has looked to the stars, but only relatively recently have we been able to reach beyond Earth's gravity. The untapped potential for space exploration and exploitation are enormous, but the cost of researching and developing viable space programs once limited the playing field to a handful of rich and technologically advanced nations.

With the rise of companies such as SpaceX, Virgin Galactic, Blue Origin, Sierra Nevada, etc., space exploration has finally become commercialized and not restricted to only wealthy industrialized countries with their geo-political agendas. Although these innovative companies have opened the playing field, there remain a prohibitive cost associated with sending objects into space. Launch costs are still in the millions of U.S. dollars, thus making satellites and zero-gravity research not quite available to all.

The cost of launching a satellite varies depending on the mass of the satellite, the orbital altitude, and the orbital inclination of the final satellite orbit. The advent of reusable launch systems has dropped the price of a launch in the range of 2,000-30,000 USD per kilogram. As total cost of placing a satellite or spacecraft into orbit is heavily dependent on the mass of the satellite, it is advantageous to reduce the mass of the attitude control system in a satellite or spacecraft being launched. One of method of reducing satellite mass would be to use an attitude control system that does not need a chemical fuel source.

An attitude control system that does not rely on chemical fuels can utilize a counter spin rotating force generated by a rotating mass. Ideally the rotating mass would be very dense and in the shape of a torus. The rotating mass can be any material composition—solid, liquid, or gas—preferably a liquid. Using a fluid allows for maximum available volume in the torus for the rotating mass. A liquid also has the inherent ability to be self-balancing when rotating.

Agile attitude control is especially important for remote sensing satellites using optical sensors to track ground targets. Agile attitude control is the capability to change the attitude of a spacecraft smoothly excessive vibration or jerking. Attitude control using thrusters tend to be less precise as the thrusters fire can jar the satellite and cause optical sensors to lose their targets.

Another disadvantage of maintaining attitude control using thruster is the residue from propellants can damage or occlude the optical sensors.

Figure 5:
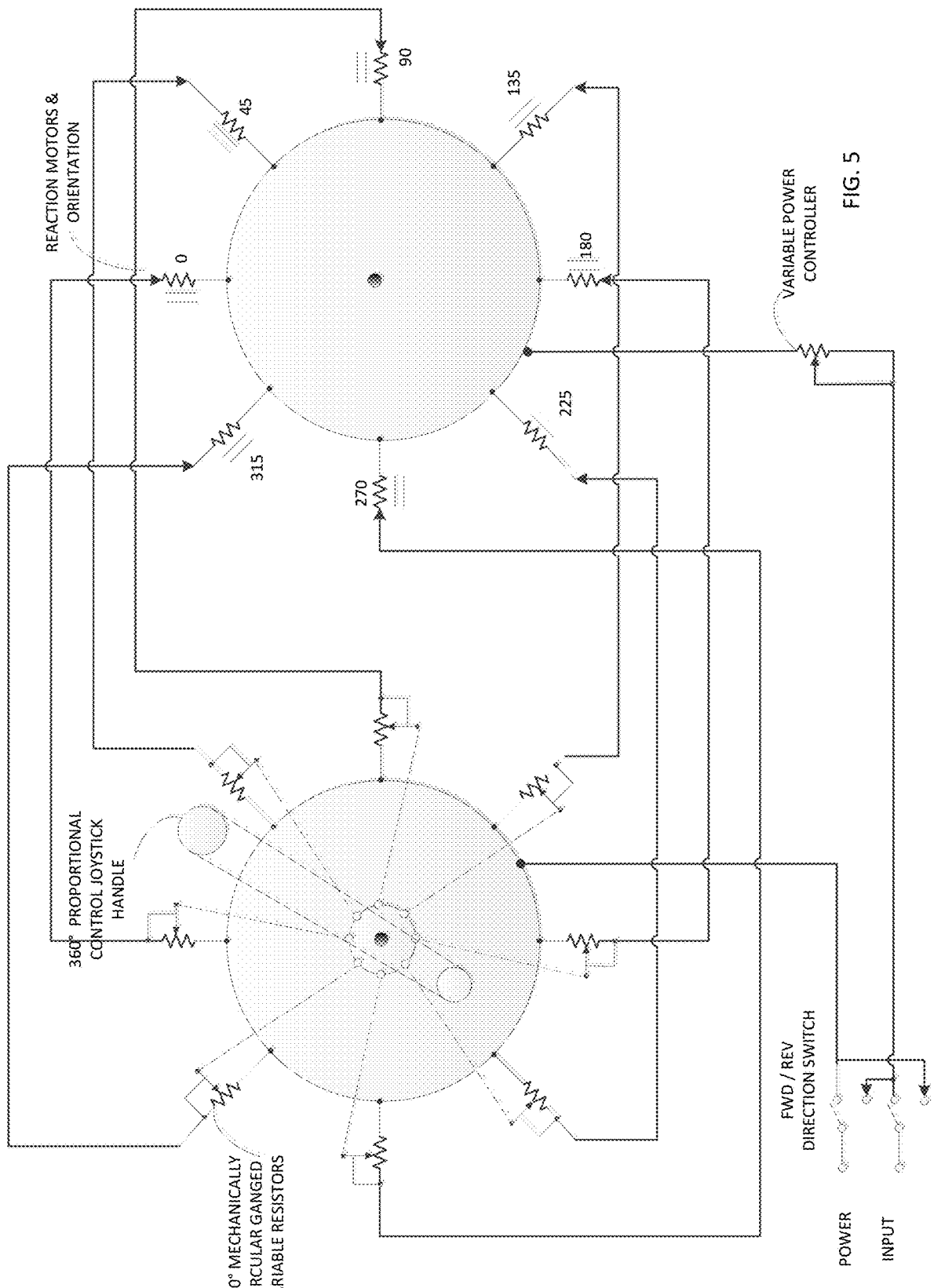
FIG. 5 is a circuit diagram of an exemplary two axis joystick controller.

Embodiments of the invention use available components and materials to create a functioning engine utilizing the underlying principles of the invention. For example, in some embodiments, eight discs are used instead of a torus shaped rotating mass. The disks are effectively eight thin "slices" of the entire rotating "torus" mass. The axis of rotation of each disk is parallel to a reference plane. The rotation of the "torus" as a whole would be perpendicular to the reference plane such that the rotating mass is through the center of the "torus" also known as the poloidal direction. The terms toroidal and poloidal refer to directions relative to a torus of reference. The poloidal direction follows a small circular ring around the surface, while the toroidal direction follows a large circular ring around the torus, encircling the central void. Referring briefly to FIG. 5, the reference plane would be the horizontal surface 528. In this illustration, the two rotating masses 512 comprise two slices of a "torus". The axis of rotation of the rotating masses 512 lie parallel to reference plane 528, but the rotation of the torus as a whole is perpendicular to the reference plane 528.

Ideally, 360 individually controlled discs would be more effective but due to engineering constraints, embodiments of the invention have fewer disks and motors. Currently each disc "slice" contributes 0.5% of effect—so having only eight "slices" results in approximately 4% effect. Within engineering constraints, more disks should result in more effective attitude control. In order to achieve agile attitude control, slices of the torus are rotated at different speeds. Rotation of the entire torus at the same speed can result in translational momentum transfer from the torus to the spacecraft, however, for purposes of attitude control, it is preferable to spin the slices of the torus at different speeds.

Embodiments of the invention use batteries to power a motor which in turn rotate a mass. Rotating masses are preferably placed on the same plane and equally spaced on that plane, e.g. about the circumference of a circle. As weight is of concern, a light weight battery would be preferred. A rechargeable battery connected to a solar array would also be capable of extending the life of the battery and thus the productive life of the satellite. Using a battery as the power source for satellite attitude control is preferred because it saves on the cost of translating a fuel source into orbit. Furthermore, a battery is a renewable source of energy that can extend the useful life of the attitude control system and thereby the useful life of the satellite. Batteries can be recharged with solar energy, thus avoiding the need for liquid or solid refueling.

The rotating force produced by each rotating mass is very slight. Within the earth's atmosphere, spin produced by a rotating mass attitude control system would not be a feasible means of turning a craft. However, in space, without gravity, even a small force would be sufficient to spin a spacecraft.

An exemplary embodiment of the invention is illustrated in FIG. 1 of this application. In FIG. 1, a rotating mass attitude control system is installed aboard an exemplary spacecraft. The spacecraft in FIG. 1 is a satellite 100 in orbit above the Earth 120. The satellite 100 is far enough away from the Earth, such that wind and gravity are not a factor limiting attitude control.

In FIG. 1, the rotating mass attitude control system is shown installed at the aft end of the satellite 100 for the sake of visualization. It would be more efficient to place the attitude control system at the center of rotation of the satellite. The front end 110 of the satellite 100 can house various communication arrays and processors dependent on the main mission criteria of the spacecraft 100. Antennas 102/104 can receive and transmit data from ground-based installations or other satellites. Data such as communication, sensor readings, satellite status, etc., can be passed through antennas 102/104. Instructions to satellite 100 can also be received by antennas 102/104. Attitude control allows the antennas 102/104 to maintain contact with their ground base for longer periods of time as they are able to reorient to face the antennas 102/104 in the direction of the ground base transmitter. Such instruction can be used for maintaining geosynchronous orbit or for directing collision avoidance. For example, instructions to spin up one or more rotating masses 112A-D can be sent to the satellite 100 through antennas 102/104. Spinning up one rotating mass would twist the spacecraft. Spinning up two rotating masses orthogonal to each other would allow for twisting in of the spacecraft on an axis between the two orthogonal rotating masses.

Sensors on the satellite 100 can also be responsible for measurement of the current attitude of the satellite 100. Relative attitude sensors such as gyroscope equipped motion reference units can determine the change in attitude but require a known initial attitude or external sensor information to determine current attitude. Absolute attitude sensors such as star trackers, sun sensor, earth sensors, magnetometers or position signals from a known terrestrial location can provide current attitude information used in agile attitude control.

As illustrated in one simplified embodiment of the invention, the rotating mass attitude control system comprises four rotating masses 112A-D. Rotating masses 112A-D can be disk shaped. The discs could be tapered, e.g. thin in the center and thicker at the circumference, perhaps even tube shaped at the circumference. Tapering the disk from center to circumference provides more mass efficient percentage effect.

Rotating masses 112A-D are located on the same circular plane, in this case at the aft end 116 of the satellite 100. Ideally, the rotating masses should be oriented in the same direction. For example, in FIG. 1 rotating masses 112A-D are oriented perpendicular to the plane of the aft end of satellite 100. Although, the rotating mass attitude control system is shown uncovered on the aft end of satellite 100 in this embodiment, a dome or other protective covering may surround the rotating mass 112 without affecting their function. In fact, it should be made clear that the rotating masses 112A-D may be mounted in other areas of the satellite 100 and still function.

The rotating mass attitude control system does not expel gasses as with traditional rocket technology, thus is preferably mounted inside the satellite 100 for example. Being mounted inside satellite 100 would allow a crew (on crewed spacecrafts) to perform maintenance on the rotating mass attitude control system. Mounting the rotating mass attitude control system inside the skin of the ship can also protect it from micro meteorites and other space debris.

Each rotating mass 112A-D, provides a counter spin force opposite its direction of rotation. By placing each rotating mass 112A-D in a planar circle equidistant from each other around the circumference of said circle, the counter spin force of each rotating mass 112A-D can change the attitude of the spacecraft on a plurality of axis. Rotating masses 112A-D can be rotated by one or more motors. The motors that spin the rotating mass 112A-D are not illustrated in FIG. 1; being inside the skin of the satellite 100.

General Equations of Motion with Momentum Exchange Devices for spacecraft motion dynamics and control follows below:

Equations of Motion with Momentum Exchange Devices Spacecraft Dynamics and Control $$\dot{H} = L$$

H is the total angular momentum vector for entire spacecraft and reaction wheel system Sum of $$H = H_b H_w$$

Angular Momentum
$H_b$ = of spacecraft
$H_w$ = of spinning disk
EOM (Equation of Motion) with "N" Variable Speed Reaction Wheels $$[I]\dot{\Omega} = -wx[I]w - [G_{s'}]\lambda s - [G_t]\lambda_t - [G_g]\lambda_g + L$$

$$T = \tfrac{1}{2} w^r [I_s] w + \tfrac{1}{2} \Sigma_{i=1}^{N} J_{s_i} (\Omega_i + W_{s_i})^2 + J_{t_i} J w_{t_i}^2 J_{g_i} (W_{g_i} + \dot{\gamma}_i)^2$$

$$\dot{T} = w^T L + \Sigma_{i=1}^{n} \lambda_i U_{g_i} + \Omega U_{s_i} \qquad \text{Energy Expression}$$

Electric motors can be utilized to spin the rotating masses. An electric motor is preferred over combustion engines due to the lack of oxygen in the vacuum of space among other reasons. Combustion engines would also require fuel that is not easily or economically replaceable. In the simplest configuration, one electric motor is coupled to one rotating mass. A one-to-one ratio of electric motor to rotating mass allows for variable independent rotation of each rotating mass for directional control. Varying the spin rate of the rotating mass 112A-D allows for fine control of rotation axis. Increasing the spin rate of rotating mass 112C for example can cause the satellite to rotate upwards. "Upwards" of course being a relative term, for the purpose of this application "upwards" is towards the top of the page in FIG. 1. Although a one-to-one ratio is preferred, more than one electric motor can be paired with a rotating mass for greater speed of rotation and increased thrust. More than one rotating mass can also be paired with each electric motor.

The embodiment of the invention, described above and illustrated in FIG. 1 is scaled to control the attitude of a large satellite. The invention, however, is not limited only to attitude control of large spacecrafts. The invention is scalable. The rotating mass attitude control system can be scaled to whatever size is needed to efficiently rotate a spacecraft or vehicle it is attached to. For example, miniaturized embodiments of the invention can be applicable to providing attitude control for CubeSats. While multiple larger rotating mass attitude control systems can be used to rotate entire space stations.

The force generated by each rotating mass 112 can be generally expressed by the following equations.

$$F = -G\frac{m_1 m_2}{r^2} \tag{i}$$

$$I = \int r^2 dm \tag{ii}$$

$$\text{Total mass } M \rightarrow \sigma = \frac{M}{\text{area}} = \frac{M}{\pi R^2} \left[\frac{\text{kg}}{\text{area}}\right]$$

$$2\pi dr\sigma = \text{differential mass} = dm$$

$$I = \int r^2 2\pi r dr \sigma = \sigma 2\pi \int_0^R r^3 dr \tag{iii}$$

$$I = 2\pi \sigma \frac{R^4}{4} = 2\pi \frac{M}{\pi r^2} \frac{Rr^4}{4} \tag{iv}$$

$$I = \frac{M}{2} R^2 \text{ moment of inertia of disk} \tag{v}$$

$$I = \int r^2 dm = R^2 \int dm = R^2 M \tag{vi}$$

$$dm = \frac{dM}{dr} \tag{vii}$$

$$E_{total} = E_{trans} + E_{rot} = \frac{1}{2}mv^2 + \frac{1}{2}Iw^2 \tag{viii}$$

$$\varepsilon = \frac{T_{trans}}{T_{rot}} \text{ so } T_{trans} = \varepsilon T_{rot} \tag{ix}$$

$$N = \frac{dL}{dT} = Iw = I\frac{dW}{dt}\left[\text{kg}\cdot\text{m}^2\frac{1}{\text{s}^2}\right] \tag{x}$$

$$F = ma \tag{xi}$$

$$F = ma = m\frac{dv}{dt} = m\frac{dv}{dx}\frac{dx}{dt} = mv\frac{dv}{dx} = m\frac{dv^2}{2dx} \tag{xii}$$

$$F = \frac{d}{dx}\left(\frac{1}{2}mv^2\right) = \frac{d}{dx}T_{trans} = \frac{d}{dx}\varepsilon T_{rot} = \varepsilon\frac{d}{dx}\left(\frac{1}{2}Iw^2\right) \tag{xiii}$$

$$F = \frac{d}{dx}(\varepsilon E_{rot}) = \varepsilon\frac{d}{dx}\left(\frac{1}{2}Iw^2\right) = \varepsilon\frac{d}{dx}\left(\frac{1}{2}\frac{1}{2}MR^2 w^2\right) \tag{xiv}$$

$$F = \frac{\varepsilon MR^2}{4}\frac{d}{dx}w^2 \tag{xv}$$

$$W = \int F \cdot dx \tag{xvi}$$

$$\omega\left[\frac{\text{rad}}{\text{s}}\right] = \frac{2\pi}{T}\left[\frac{1}{\text{s}}\right] = \frac{2\pi \cdot 60}{T_{rpm}} \tag{xvii}$$

$$N_{rpm}\left[\frac{2\pi}{\text{min}}\right] = \frac{N_{rpm}}{60}\left[\frac{2\pi}{\text{s}}\right] = \frac{N_{rpm}}{60}2\pi\left[\frac{\text{rad}}{\text{s}}\right] \tag{xviii}$$

$$W = \frac{2\pi}{60}N_{rpm} \tag{xix}$$

$$F = \mu F_n = \mu M_{disk} g \tag{xx}$$

The motors spinning the rotating masses 112A-D can be powered by a battery 114 which in turn is recharged by solar panels 106 and 108. Electric motors are preferred because they do not need to combust solid or liquid fuel. Electric motors, however, need a source of electricity to provide power to the motors. Battery 114 can provide a source of electricity that is rechargeable for thousands of recharge cycles, thus potentially extending the life of the satellite to dozens of years of use. Battery 114 can be of any type e.g. nickel cadmium, nickel metal hydride, lithium ion, etc. with preference to lighter more efficient batteries with more recharge cycles and greater energy density. In order to continuously provide electricity to the electric motors, battery 114 can be coupled to one or more solar collectors 106 and 108 that are preferably moveable to maximize solar energy collection.

Figure 2A:
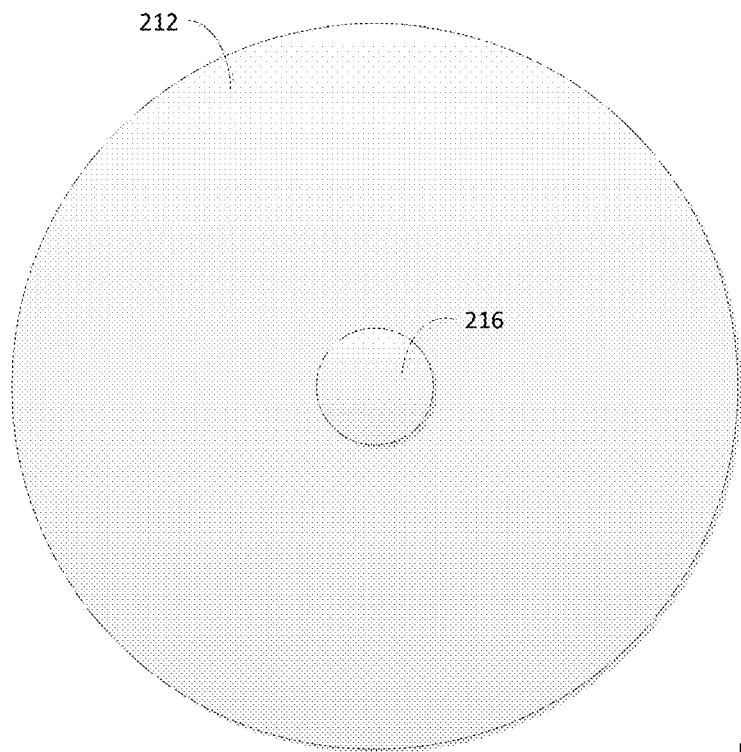
FIG. 2A illustrates a side view of a single disk of the rotating mass attitude control device.
Figure 2B:
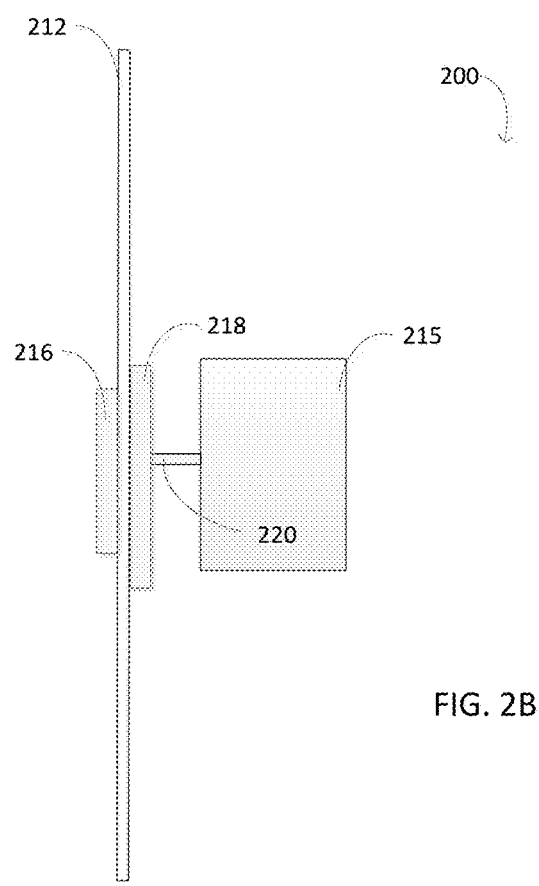
FIG. 2B is a side view of a single rotating mass and motor of the exemplary rotating mass attitude control device.

The rotating mass 212 is illustrated in more detail in FIG. 2A and FIG. 2B. A frontal view of an exemplary rotating mass 212 is shown in FIG. 2A. The illustrated rotating mass 212 can be a disk with a center restraint 216 located substantially at the center of rotation of the disk. Center restraint 216 holds the disk in place as it rotates at high velocity about the center of rotation. A variety of methods of holding the rotating mass 212 is contemplated within the scope of the invention and should be known to a person of ordinary skill in the art.

In FIG. 2B a basic rotating mass unit 200 is shown. As illustrated in FIG. 2B, the rotating mass 212 is sandwiched between center restraint 216 and backplate 218. To securely hold rotating mass 212 between center restraint 216 and backplate 218, a screw can be threaded through the middle of center restraint 216, rotating mass 212 and backplate 218, fastening all three structures together so that they rotate as one. A shaft 220 can be affixed to backplate 218. Motor 215 rotates the shaft 220 which in turn rotates the rotating mass 212.

In FIG. 2B the rotating mass 212 are illustrated as rigid disks of uniform shape and density. As previously mentioned, the disks may be tapered such that the center is thinner and the outer circumference thicker allowing more mass to be concentrated at the outer portion of the spinning disks. The shaft 218 should be attached to rotating mass 212 at the center of rotation of the rotating mass 212 to reduce wobble. Other means of affixing rotating mass 212 to shaft 218, such as welds, locknuts, friction fit, etc., should be considered within the scope of the invention.

Figure 3A:
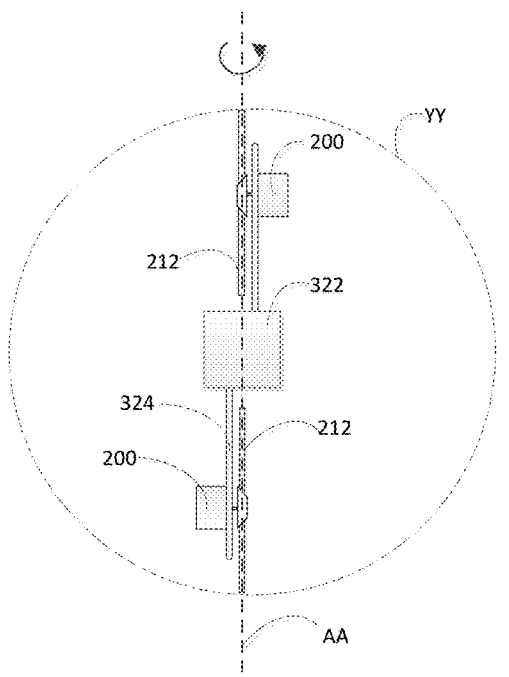
FIG. 3A-D are a top down view of exemplary rotating mass attitude control device with n rotating mass units.

FIGS. 3A-D illustrate various positioning possibilities rotating mass attitude control unit in different embodiments of the invention. In FIG. 3A two rotating mass attitude control units 200, like those described in FIG. 2B are positioned opposite each other, substantially 180 degrees apart. Each rotating mass attitude control unit 200 is attached to a mounting frame 322 by a mounting arm 324. The rotating mass 212 of each rotating mass attitude control unit 200 are orientated in the same direction, perpendicular to the plane of paper. Ideally, the center of rotation of each rotating mass should be on the same plane; said plane represented by the virtual circle YY in FIG. 3A. To reduce twisting in unaccounted directions, opposite mass attitude control unit 200 are mounted such that their rotating masses 212 are along the same axis AA through the center of a mounting frame 322 and circle YY. Likewise, the edge of each rotating mass 212 lie on the circumference of circle YY, thereby the distance of each rotating mass 212 from the center of circle YY is substantially the same and the moment of each rotating mass 212 should be substantially the same.

Figure 3B:
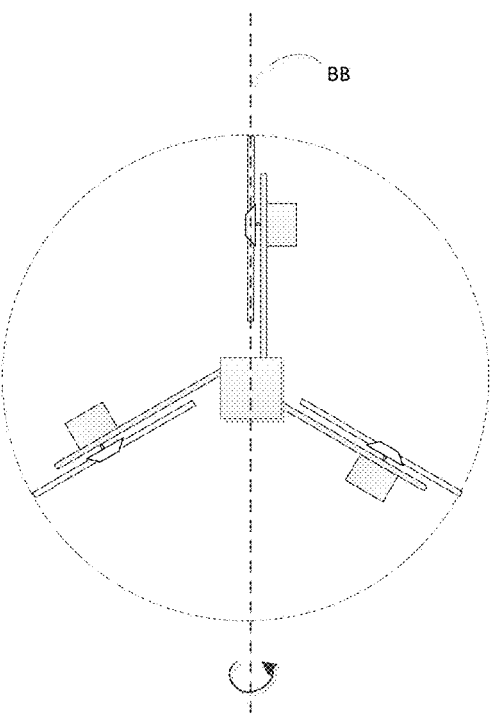
Figure 3C:
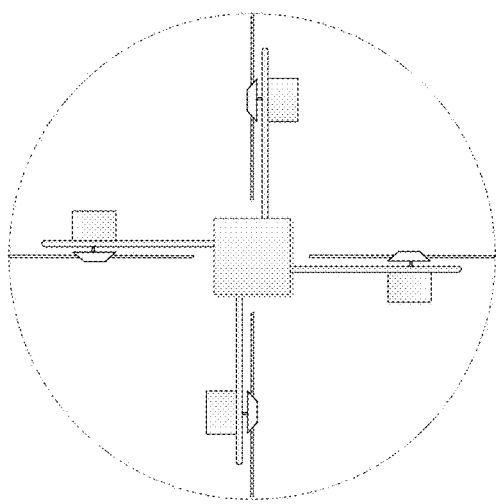
Figure 3D:
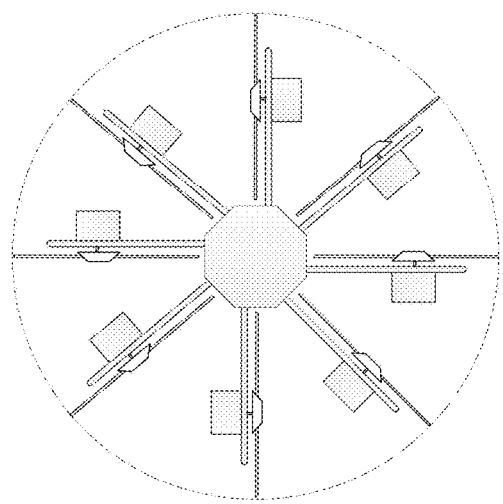

FIG. 3B illustrates 3 rotating mass attitude control units on the same plane approximately 120 degrees apart. FIG. 3C illustrates 4 rotating mass attitude control units on the same plane approximately 90 degrees apart. FIG. 3D illustrates 8 rotating mass attitude control units on the same plane approximately 45 degrees apart. It should be apparent from the illustrations that numerous positions and quantities of rotating mass attitude control units are possible. Placing the rotating mass attitude control units at equidistant points balances out the counter spin of the rotating mass attitude control system and mitigates unaccounted for torque "twist" about the plane of the circle.

Although the rotating mass attitude control units of FIG. 3A-D are illustrated positioned much like spokes on a wheel, other positions can also be viable. For example, the rotating masses can be placed along the sides of a square. In embodiments of the invention with multiple rotating mass units it is preferable that the rotating masses are equally spaced apart, such that the spin at each rotating mass is balanced by one or more of the other rotating masses to aid in correcting for over spin. Furthermore, the center of rotation of each rotating mass should be on the same plane to reduce unaccounted for "twist".

Figure 4:
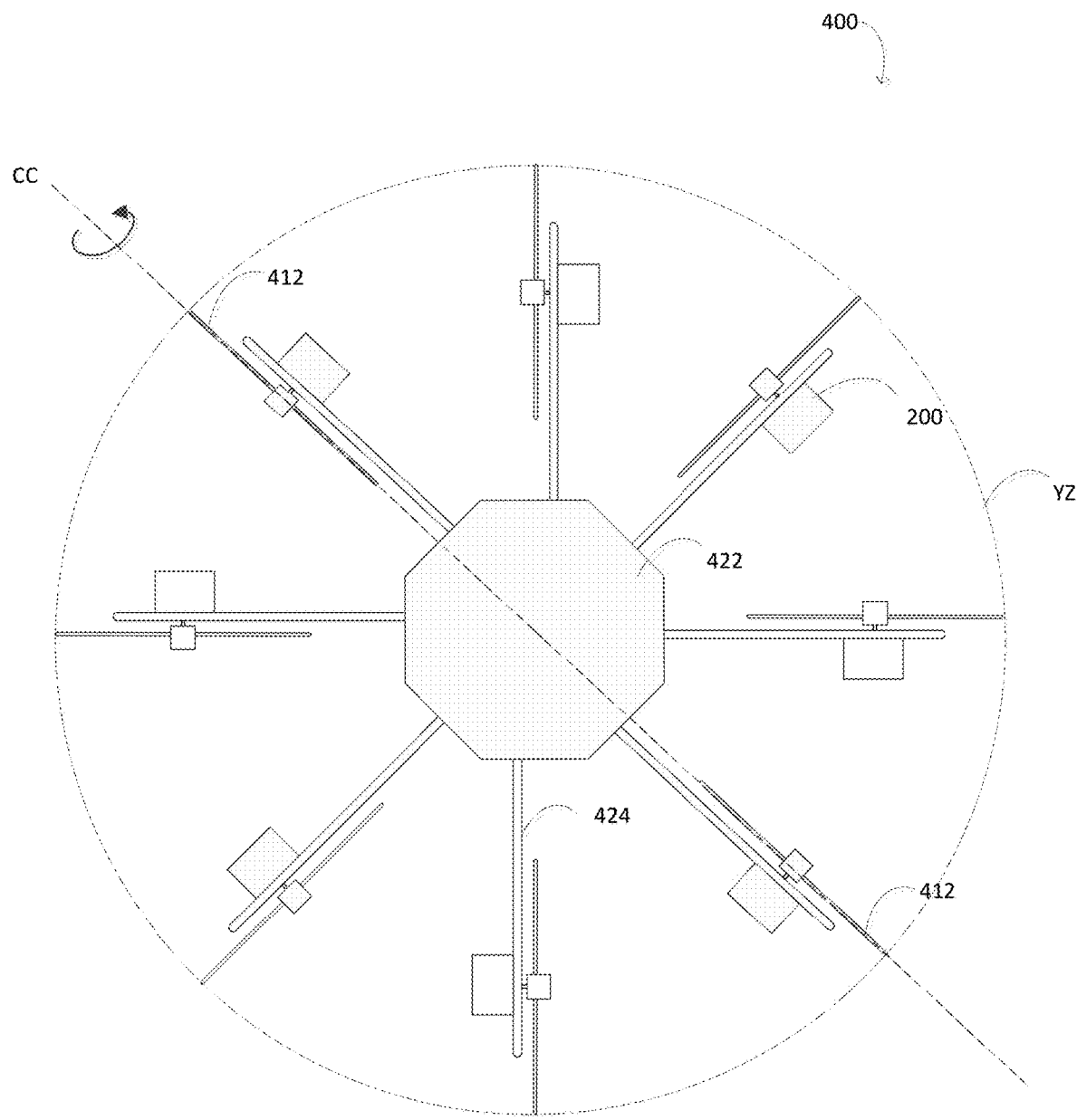
FIG. 4 is a top down view of an exemplary rotating mass attitude control device.

Referring now to FIG. 4; a top down view of an embodiment of the invention with eight rotating mass attitude control units 200, each placed at a side of an octagonal frame 422. As with the previously described embodiments of the invention, each rotating mass attitude control unit 200 is placed an equidistance apart to balance out the spin provided by the rotation of each rotating mass 412. Mounting arms 424 and motors are offset so that the discs are exactly in the centerline of the circle and opposite 180 degrees. For example, in FIG. 4, two of the rotating masses 412 are positioned along an axis CC such that they are 180 degrees opposite each other. Axis CC runs through the center of the octagonal frame 422 as well as the center of virtual circle YZ.

Certain specifications are hereby provided for the components described in FIG. 4, however, the scope of the invention is not be limited to only the specifications of these components. For example, different motors with different specifications can be used without deviating from the principles of the invention hereby described in the exemplary embodiment in FIG. 4.

In the embodiment of the invention illustrated in FIG. 4, Eight 3-phase brushless 2300 KV (which stands for 2300 RPM per volt) motors are used to rotate plastic disks. The disks have a mass of 14 grams each with two disks mounted on each motor for a total of 224 grams of rotating mass 412. The eight motors are controlled through a 20 amp "ESC" (Electronic speed control) controller. An electronic speed control or ESC is an electronic circuit that controls and regulates the speed of an electric motor. An ECS can also reverse the direction of the motor and provide dynamic braking or regenerative braking. A regenerative braking system can be employed to recover some energy to the battery by converting the kinetic energy of the rotating mass 412 back into stored potential energy in the battery. The ESC sends pulsed DC current to each motor with faster pulses providing faster motor speed. For the ESC used in embodiment of FIG. 4, the max pulse rate is 35,000 RPM on a 12-pole motor.

Each motor has a separate ESC to provide independent rotation speed control to each motor, thus providing variable spin and a form of attitude control for multiple axis. In embodiments of the invention, the ESC's are wired to a flight controller such as a joystick controller.

In the embodiment illustrated in FIG. 4, 224 grams of rotating mass, rotating at 3549 RPM the current draw was 1.67 amps. 4427 RPM=2.42 amps and 5828 RPM=4.25 amps. It was found that at 0 RPM (idle) there was a current draw of 0.54 amps.

FIG. 5 illustrates a circuit diagram for an exemplary two axis (x-y) joystick controller for embodiments of the invention. The two-axis x-y joystick controller comprises a lever or handle with a collar and the mechanical linkage to allow 360-degree movement. A two-axis joystick controller allows smooth continuous control of each of the variable resistors in proportion to where the joystick is positioned.

The joystick circuit diagram in FIG. 5 illustrates a means of proportional power control of the reaction motors. For example, when the joystick handle is pressed to the right (90 degrees) the right motor at the 90 degree position receives proportionally more power than the motors at the other positions. In this way, the position of the joystick determines the amount of power each motor receives, which in turn determines the speed at which each motor rotate the mass attached to the motor. The speed of each rotating mass, in turn, changes the attitude of the spacecraft.

When the joystick handle is upright there is 50% power to each motor and if the power is increased by the variable power controller all the motors will be spinning at the same speed and there will be a translational momentum transfer.

Other joystick designs can function just as well. For example, an analog joystick with an x-axis potentiometer and y-axis potentiometer can be used to measure the change in resistance as the joystick moves around a resistive track.

The exemplary circuit diagram in FIG. 5 illustrates manual joystick control of Direct Current (DC) armature motors. In a preferred embodiment, pulsed DC brushless motors with pulse controllers instead of DC armature motors. Instead of a joystick input, an electronic speed control directed by guidance, navigation, and control algorithms would change the speed of individual motors to orientate the satellite as required for tracking, communication, etc. The exemplary joystick circuit diagram, while not preferred for use in satellite agile attitude control, is useful in illustrating the proportional power distribution to each individual motor.

Figure 6:
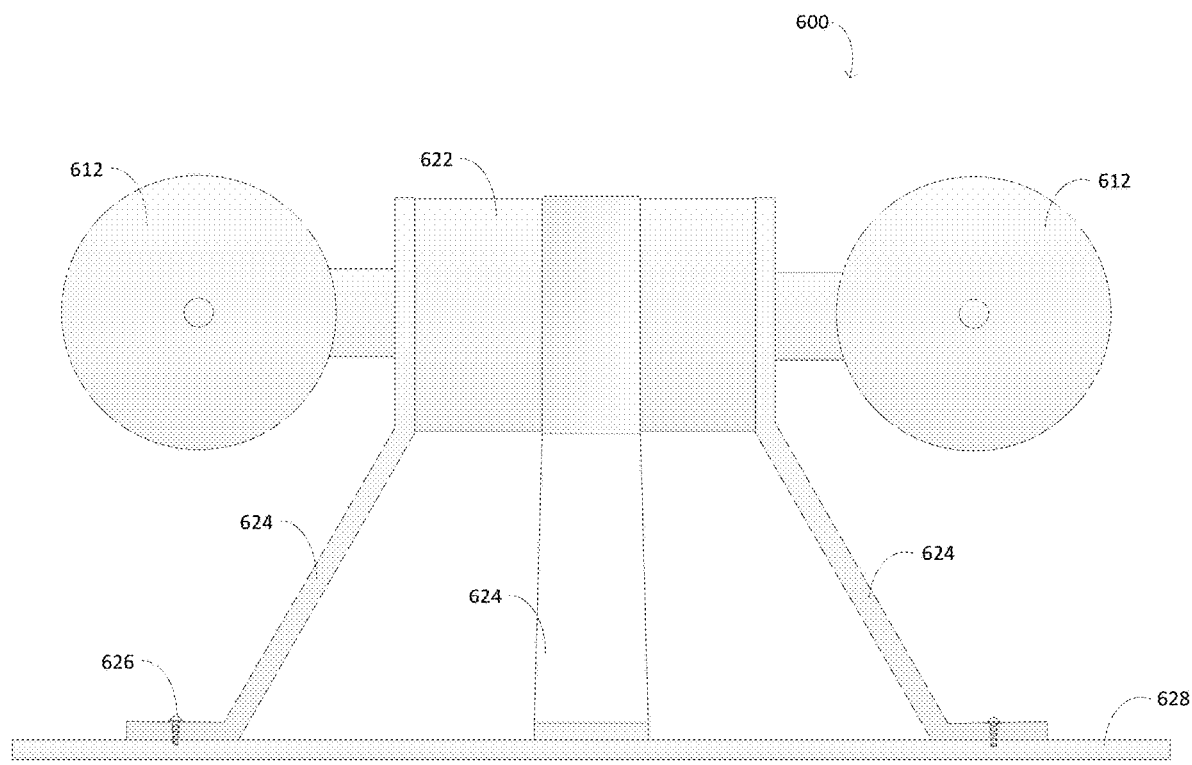
FIG. 6 is a front view of an exemplary rotating mass attitude control device secured to a mount.

An engine mount 500 may be used to secure the rotating mass attitude control system 400 of FIG. 4 to a spacecraft. An example of said engine mount 500 is illustrated in FIG. 6. An engine mount 600 with mounting legs 624 is shown in a frontal view illustration in FIG. 6. Each leg 624 of the engine mount 600 can be attached to a side of the octagonal frame 622 of the rotating mass attitude control system 400 of FIG. 4D. Only two of the 8 rotating masses 612 are shown in FIG. 6 to prevent a confusing clutter that may hide more important details of the engine mount 600.

Engine mount 600 can be mounted to the frame 628 of the spacecraft at each horizontal mounting point at the lower portion of the legs 624. A screw 626 or other method, e.g. welding, rivet, etc., of affixing the leg 624 to the frame 628 of a spacecraft can be used. Engine mount 600 can be formed of a light weight rigid material such as aluminum, stainless steel, or plastic. A factor in selecting the material of the engine mount 600 is of course the tensile strength needed to withstand the thrust generated by the rotating mass attitude control system. Engine mount material must be able to withstand the dynamic force exerted by the engine during operation as well as the mass of the engine unit. Engine mount 600 can also be mounted to any strong horizontal surface inside the skin of the spacecraft. It can be desirable to make engine mount 600 easily mountable and removeable to make each rotating mass attitude control unit modular. Astronauts, with limited tools, can remove, replace, or add modular rotating mass attitude control unit as needed during spacewalks.

CONCLUSION

Although certain exemplary embodiments and methods have been described in some detail, for clarity of understanding and by way of example, it will be apparent from the foregoing disclosure to those skilled in the art that variations, modifications, changes, and adaptations of such embodiments and methods may be made without departing from the true spirit and scope of the invention. This disclosure contemplates other embodiments or purposes.

For example, it will be appreciated that one of ordinary skill in the art will be able to employ a number of corresponding alternative and equivalent structural details, such as equivalent ways of fastening, mounting, coupling, or engaging tool components, equivalent mechanisms for producing particular actuation motions, and equivalent mechanisms for delivering electrical energy. As another example, structural details from one embodiment may be combined with or utilized in other disclosed embodiments. Therefore, the above description should not be taken as limiting the scope of the invention which is defined by the appended claims.

What is claimed is:

1. A rotating mass attitude control system for a spacecraft comprising;
    a plurality of rotating mass attitude control units coupled to engine mounts, each of the rotating mass attitude control units further comprising;
        an electric motor to rotate a shaft;
        a rotating mass attached to the shaft;
        one or more batteries electrically coupled to the electric motor to provide power to the electric motor; and
        a speed control unit to control speed of rotation of the shaft;
    a solar collector array to provide power to the one or more batteries; and
    wherein the rotating masses rotate in the same poloidal direction relative to their respective electric motor;
    wherein the rotating mass is arranged in a torus formation with other poloidal rotating masses at equidistant points around a circle on a plane.

2. The rotating mass attitude control system of claim 1, wherein the rotating mass is a disk.

3. The rotating mass attitude control system of claim 2, wherein the disk is thicker at the disk's circumference and thinner at the disk's center.

4. The rotating mass attitude control system of claim 1, wherein the battery is a rechargeable battery.

5. The rotating mass attitude control system of claim 1, wherein the speed control unit is an electronic speed control unit configured to pulse direct current to the electric motor.

6. The rotating mass attitude control system of claim 5, wherein the electronic speed control unit is coupled to and electronically controlled by a guidance controller configured to receive attitude control inputs and translate the attitude control inputs into speed control outputs at the electronic speed controller.

7. The rotating mass attitude control system of claim 1, wherein spacecraft is configured to operate in low and zero gravity non-atmospheric conditions.

8. A rotating mass attitude control unit of a rotating mass attitude control system comprising;
    an electric motor configured to receive Direct Current (DC) pulses and rotate a shaft at a speed dependent upon a frequency of the pulses;
    a rechargeable battery electrically coupled to the electric motor, the rechargeable battery configured to drive the electric motor;
    an electronic speed controller coupled to the electric motor, the electronic speed controller configured to control the speed of rotation of the shaft by varying the frequency of the DC pulses received by the electric motor; and
    a rotating mass attached to the shaft;
        wherein the rotating mass is arranged in a torus formation with other poloidal rotating masses at equidistant points around a circle on a plane to control the attitude of a spacecraft.

9. The rotating mass attitude control unit of claim 8, wherein the rotating mass is a disk.

10. The rotating mass attitude control system of claim 9, wherein the disk is thicker at the disk's circumference and thinner at the disk's center.

11. The rotating mass attitude control system of claim 8, wherein the electronic speed control unit is coupled to and electronically controlled by a guidance controller configured to receive attitude control inputs and translate the attitude control inputs into speed control outputs at the electronic speed controller.

12. A method of attitude control using a rotating mass for a spacecraft, comprising:
    receiving attitude control inputs at a guidance controller, the guidance controller coupled to one or more electronic speed controller;
    translating the guidance inputs at the guidance controller into pulse width modulated (PWM) outputs and sending the PWM outputs to a plurality of electronic speed controllers;
    receiving PWM outputs at the electronic speed controllers and sending Direct Current (DC) pulses to a plurality of electric motors to rotate a shaft coupled to the electric motors at a speed dependent upon a frequency of the pulses as directed by the guidance controller; and
    rotating a mass coupled to each shaft,
    wherein each electric motor is mounted to a frame of the spacecraft, such that the rotating mass is arranged in a torus formation with other poloidal rotating masses at equidistant points around a circle on a plane to control the attitude of a spacecraft.

13. The method of claim 12, wherein the rotating mass is a disk.

14. The method of claim 12, wherein the disk is thicker at the disk's circumference and thinner at the disk's center.

15. The method of claim 12, further wherein the guidance input directs the speed controller to spin all the electric motors at the same speed causing a translational momentum transfer to the spacecraft.

16. The method of claim 12, wherein the battery is a rechargeable battery.

* * * * *